United States Patent
Karp

(10) Patent No.: US 7,610,407 B2
(45) Date of Patent: Oct. 27, 2009

(54) METHOD FOR EXCHANGING INFORMATION BETWEEN AT LEAST TWO PARTICIPANTS VIA AT LEAST ONE INTERMEDIARY TO LIMIT DISCLOSURE BETWEEN THE PARTICIPANTS

(75) Inventor: Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1219 days.

(21) Appl. No.: 10/733,502

(22) Filed: Dec. 11, 2003

(65) Prior Publication Data

US 2005/0132073 A1    Jun. 16, 2005

(51) Int. Cl.
G06F 15/16 (2006.01)
G06F 21/00 (2006.01)
G06Q 10/00 (2006.01)

(52) U.S. Cl. .................. 709/246; 709/203; 709/200; 709/229; 705/1; 705/50

(58) Field of Classification Search ......... 709/201–202, 709/246, 200, 203, 229; 705/1, 80, 50
See application file for complete search history.

(56) References Cited

U.S. PATENT DOCUMENTS

| | | | |
|---|---|---|---|
| 5,152,292 A | 10/1992 | Karp | |
| 5,249,578 A | 10/1993 | Karp et al. | |
| 5,341,321 A | 8/1994 | Karp et al. | |
| 5,515,308 A | 5/1996 | Karp et al. | |
| 5,515,852 A | 5/1996 | Karp et al. | |
| 5,588,117 A | 12/1996 | Karp et al. | |
| 5,671,170 A | 9/1997 | Markstein et al. | |
| 5,689,653 A | 11/1997 | Karp et al. | |
| 5,710,881 A | 1/1998 | Gupta et al. | |
| 5,742,778 A | 4/1998 | Hao et al. | |
| 5,748,936 A | 5/1998 | Karp et al. | |
| 5,801,977 A | 9/1998 | Karp et al. | |
| 5,844,553 A | 12/1998 | Hao et al. | |
| 5,881,280 A | 3/1999 | Gupta et al. | |
| 5,944,819 A | 8/1999 | Kumar et al. | |
| 5,946,716 A | 8/1999 | Karp et al. | |
| 6,134,326 A * | 10/2000 | Micali | 380/30 |
| 6,205,466 B1 | 3/2001 | Karp et al. | |
| 6,314,453 B1 | 11/2001 | Hao et al. | |
| 6,321,328 B1 | 11/2001 | Karp et al. | |
| 6,470,339 B1 | 10/2002 | Karp et al. | |
| 6,493,712 B1 | 12/2002 | Karp et al. | |
| 6,658,410 B1 * | 12/2003 | Sakamaki et al. | 707/4 |
| 7,171,559 B1 * | 1/2007 | Bao et al. | 713/169 |
| 7,181,017 B1 * | 2/2007 | Nagel et al. | 380/282 |
| 2002/0165726 A1 * | 11/2002 | Grundfest | 705/1 |
| 2004/0002914 A1 * | 1/2004 | Munro | 705/38 |
| 2004/0030894 A1 * | 2/2004 | Labrou et al. | 713/168 |
| 2008/0071693 A1 * | 3/2008 | Ferstenberg et al. | 705/80 |

\* cited by examiner

Primary Examiner—Nathan J Flynn
Assistant Examiner—Joshua Joo

(57) ABSTRACT

The disclosed embodiments relate to a method of exchanging information between at least one party and a plurality of intermediaries, the plurality of intermediaries including a selected intermediary. The method may comprise providing correct information to the selected intermediary, providing incorrect information to each of the plurality of intermediaries who are not the selected intermediary, receiving modified information based on the correct information from the selected intermediary, receiving modified information based on the incorrect information from each of the plurality of intermediaries who are not the selected intermediaries, and wherein the plurality of intermediaries do not know the identity of the selected intermediary.

30 Claims, 4 Drawing Sheets

METHOD FOR EXCHANGING INFORMATION BETWEEN AT LEAST TWO PARTICIPANTS VIA AT LEAST ONE INTERMEDIARY TO LIMIT DISCLOSURE BETWEEN THE PARTICIPANTS

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In electronic commerce and data marketing, parties frequently exchange information and technology that is proprietary yet susceptible to misappropriation. For example, one party may have proprietary data which is useful with a proprietary program owned by a second party. It may be desirable to analyze the proprietary data with the proprietary program to provide useful and valuable results. However, risks are involved with such an exchange. Often times, parties desiring to exchange information and/or technology are mutually untrusting parties. In other words, a party that owns proprietary data may be suspicious that a party with a proprietary program might be inclined to sell or otherwise disclose the proprietary data in an inappropriate manner. Similarly, a party that has developed a proprietary program may not trust the party that owns the proprietary data with the program, fearing that the party that owns the proprietary data might reverse engineer the proprietary program and decipher a valuable algorithm or the like.

Accordingly, the data owner may not wish to reveal the data to the program owner and the program owner may not wish to reveal the program to the data owner. One potential solution may be to employ a third party intermediary (i.e. a party who owns neither the proprietary data nor the proprietary program) to perform the analysis on the proprietary data using the proprietary program and provide the results to the requesting party. The use of a third party intermediary, however, is only appropriate in a situation in which both the owner of the proprietary data and the owner of the proprietary program trust that the intermediary will not inappropriately disclose or try to profit from its access to either the proprietary data or the proprietary program.

In view of the potential misappropriation discussed above, it is desirable to have a technique for sharing information and/or technology that reduces the risk of revealing proprietary information and/or technology inappropriately to other participating parties or subjecting the information and/or technology to easy misappropriation by others not involved in the transaction at all and to provide other advantages.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking for those of ordinary skill having the benefit of this disclosure.

Figure 1:
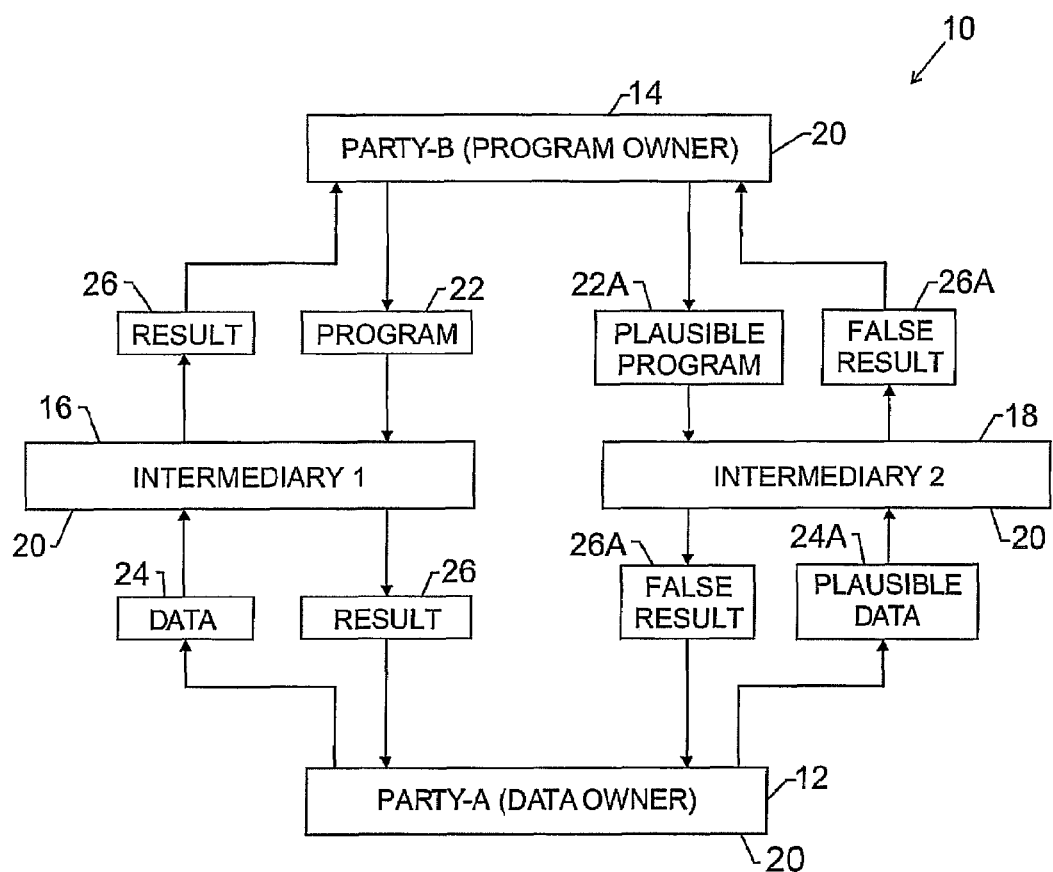
FIG. 1 is a block diagram illustrating an algorithm for the sharing or exchange of information, data, and/or technology between parties through a plurality of intermediaries in accordance with certain embodiments of the present invention.

FIG. 1 is a block diagram illustrating an algorithm 10 for the sharing or exchange of information, data, and/or technology between parties (Party-A 12 and Party-B 14) through a plurality of intermediaries 16, 18 in accordance with certain embodiments of the present invention. The algorithm 10, for example, allows for the combination of proprietary information and/or technology from all of the parties 12, 14 to obtain further information or data without disclosing proprietary information of one of the parties to the other.

All parties 12, 14 and intermediaries 16, 18 represented in FIG. 1, may be referred to collectively as participants 20. And, while FIG. 1 merely illustrates two intermediaries 16, 18 in direct communication with two parties 12, 14, other embodiments can be envisaged wherein different numbers of participants 20 are involved in direct and indirect communications. For example, in one embodiment more than two intermediaries 16, 18 in direct communication with the parties 12, 14 are participants 20. Alternatively, in another embodiment, multiple levels of intermediaries 16, 18 may be used such that some intermediaries 16, 18 communicate only with other intermediaries 16, 18. Further, in another embodiment, the algorithm 10 may include a number of participants 20 configured such that the intermediaries 16, 18 cannot communicate with at least one of the parties 12, 14. Additionally, other embodiments can be envisaged wherein more than two of the participants 20 are parties 12, 14.

While many different types of information and/or technology sharing can be envisaged, FIG. 1 specifically illustrates the sharing of a proprietary program 22 and proprietary data 24 such that the program 22 interprets the data 24 and yields results 26 that can be disclosed to at least one of the parties 12, 14 that requests the analysis. Further, in the illustrated embodiment, the parties 12, 14 may agree at random on a selected intermediary 16 to receive the correct data 24 and the correct program 22. The parties give plausible but incorrect data 24A and a plausible but incorrect program 22A to all but the selected intermediary 16. Accordingly, the algorithm 10, as illustrated in FIG. 1, is being used to prevent disclosure of the proprietary program 22 to Party-A 12 and also to prevent disclosure of the proprietary data 24 to Party-B 14. Further, the algorithm 10 also prevents the intermediaries 16, 18 from misappropriating the proprietary data 24 and/or the proprietary program 22.

The algorithm 10 may be effective when there is little trust among the participants 20. Additionally, it is desirable that the intermediaries 16, 18 merely know that other intermediaries 16, 18 exist without knowing the other intermediary 16, 18 identities. In the illustrated embodiment, the intermediaries 16, 18 do not know who the selected intermediary 16, 18 is, but they do know that any participating intermediaries 16, 18 may potentially have the incorrect data 24A and/or the incorrect program 22A. Other embodiments can be envisaged wherein a single intermediary is utilized (not shown) instead of a plurality of intermediaries 16, 18. In such an embodiment, the single intermediary would be given multiple sets of data, some correct, some incorrect and multiple programs, at least one being correct and others being incorrect. Additionally, the single intermediary would not be informed which of the programs or data sets were correct thus achieving similar results to other embodiments described herein. In another embodiment wherein a single intermediary is utilized, the single intermediary is given the correct data 24 and the correct program 22 but is told that many intermediaries are being used.

Turning to the preventative aspects of the algorithm 10, the algorithm 10 helps to prevent the proprietary program 22 and the proprietary data 24 from being respectively disclosed to Party-A 12 and/or Party-B 14 by requiring that the only recipients of the program 22 and data 24 be one of the intermediaries 16, 18, who presumably do not share either the program 22 or the data 24 with the respective opposing party 12, 14. Further, the algorithm 10 prevents the intermediaries 16, 18 from misappropriating either the program 22 or data 24 by causing it to be unknown to the intermediaries 16, 18 whether they received the erroneous but plausible data 24A and/or the incorrect but plausible program 22A or alternatively the correct version of the data 24 and/or the correct program 22. Thus, for example, if one of the intermediaries 16, 18 attempts to utilize the program 22, the data 24, or the results 26, the intermediary 16, 18 risks utilization of false results 26A or false information resulting in an erroneous outcome. Further, if the intermediaries 16, 18 provide an outside party with such erroneous information, the intermediary 16, 18 risks establishing a bad reputation within that intermediary's business community.

The illustration in FIG. 1, as discussed previously, represents Party-A 12 and Party-B 14 as respective owners of the data 24 and the program 22. In the illustrated embodiment, both Party-A 12 and Party-B 14 receive the results 26 from the intermediaries 16, 18 who have obtained the results 26 by interpreting the data 24 with the program 24. One reason for such a disbursement is that the interpreted data or results 26 are valuable to both Party-A 12 and Party-B 14. However, in other embodiments, only one of Party-A 12 and Party-B 14 (the requesting party) may receive the results.

Figure 2:
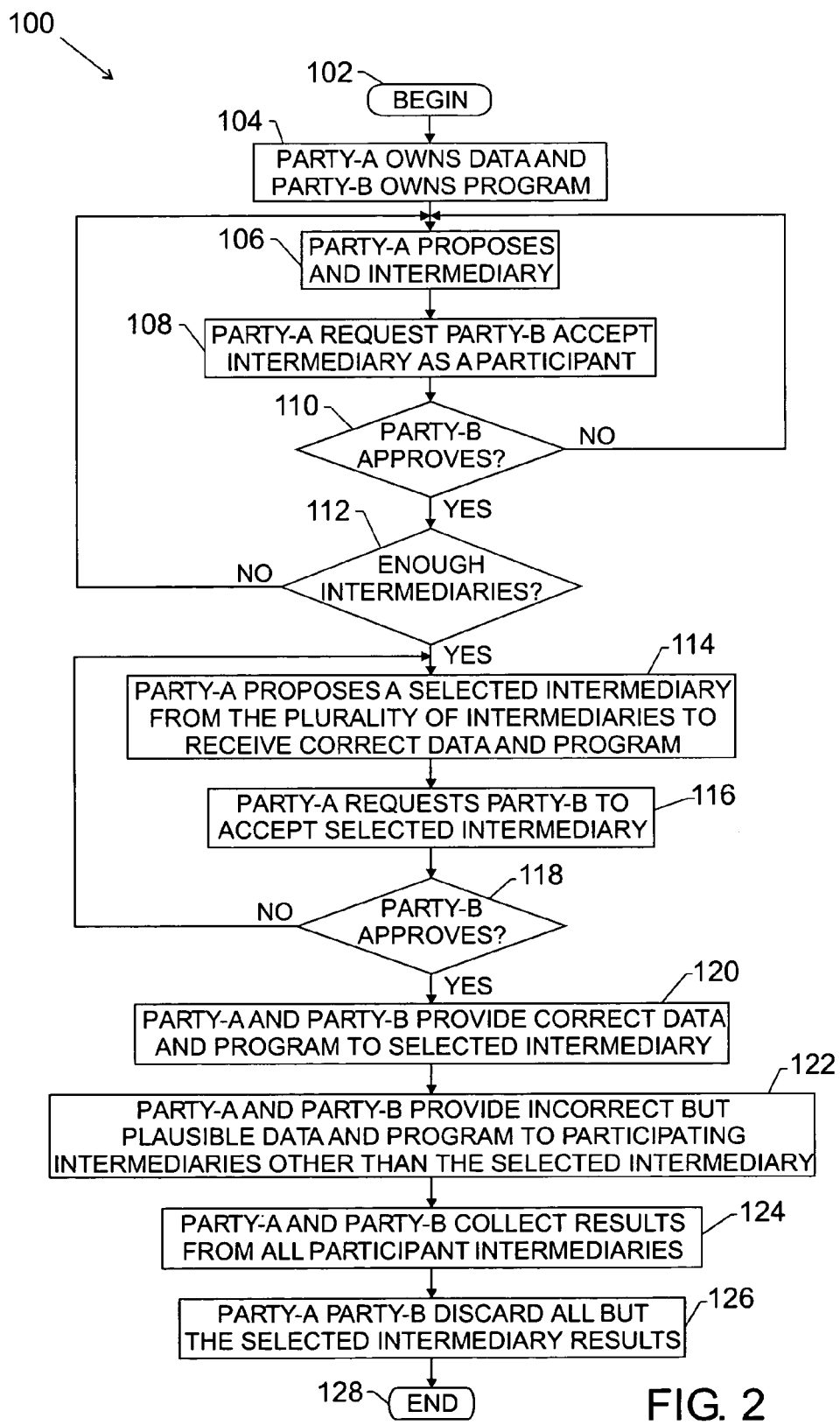
FIG. 2 is a flow chart that illustrates a process in accordance with certain embodiments of the present invention.

FIG. 2 is a flow chart that illustrates a process in accordance with certain embodiments of the present invention. The process is generally referred to by the reference numeral 100. The process 100 may be used for sharing a proprietary program owned by one party and proprietary data owned by a second party through a plurality of intermediaries. The intermediaries utilize the program to interpret the data, thus yielding results. The results are then shared with the owner of the program and the owner of the data without disclosing any proprietary information between the two. Specifically, in FIG. 2, block 102 represents the start of the process. Block 104 represents that in the illustrated embodiment, there are two parties, Party-A and Party-B, each respectively owning the proprietary data and the proprietary program. However, other embodiments can be envisaged wherein there are more than two parties and wherein the parties own other forms of proprietary information. For example, first and second parties having separate but combinable proprietary data and a third party having a program for analyzing the combined data may all be participants in one embodiment of the present invention.

In block 106, Party-A proposes an intermediary and in block 108, requests that Party-B accept the proposed intermediary. Block 110 represents a decision by Party-B to either approve (YES) or disapprove (NO) of the proposed intermediary. If Party-B disapproves, the process 100 returns to the step illustrated by block 106 in FIG. 2 and Party-A again proposes an intermediary. If the proposed intermediary is approved by Party-B, the process 100 continues to block 112, which represents a question as to whether enough intermediaries have been designated (YES) or not (NO). If it is determined that not enough intermediaries have been designated (NO) the process 100 again returns to block 106 having already designated at least one intermediary. If it is determined that the parties designated enough intermediaries (at least one), the process 100 proceeds to block 114. In other embodiments, different parties may make the initial proposal and in yet other embodiments, different methods may be used to determine the plurality of intermediaries.

Once the parties have selected the plurality of intermediaries, Party-A proposes a selected intermediary from the plurality of intermediaries to receive correct data and a correct program, as illustrated by block 1 14. Next, as illustrated by block 116, Party-A requests that Party-B accept the selected intermediary. Block 118 represents the decision of Party-B to either accept (YES) or reject (NO) the proposed selected intermediary. If Party-B rejects the selected intermediary, the process returns to block 114, Party-A proposes another selected intermediary from the plurality of intermediaries, and the process 100 continues. If Party-B accepts the selected intermediary, the process 100 moves on to providing data and the program, as illustrated in block 120. This iterative process 100, in part, helps to provide assurance that a given party is not cooperating with a given intermediary. In other embodiments, different parties may make the initial proposal and in still other embodiments, different methods are used to determine the select intermediary, for example, by a random selection process.

Once a selected intermediary is agreed upon, Party-A and Party-B provide the correct data and the correct program, respectively, to the selected intermediary, as illustrated in block 120. Other embodiments can be envisaged wherein there is more than one selected intermediary. Additionally, as shown by block 122, incorrect but plausible data and incorrect but plausible programs are provided to the intermediaries other than the selected intermediary. Party-A and Party-B then collect results from all of the intermediaries, including the selected intermediary (block 124), and discard all but the selected intermediary's results (block 126). Thus, the end of the process is achieved (block 128). Other embodiments can be envisaged in which results from multiple selected intermediaries are combined to get the desired results. In other embodiments, a plurality of parties is involved and only one or less than all parties collect the results. Additionally, other embodiments can be envisaged wherein results are only collected from a certain number of intermediaries.

As a result of the technique illustrated in FIG. 2, which is an exemplary embodiment of the claimed invention, no intermediary may safely use or resell either the program or the data because it may be incorrect. However, in order for this technique to be effective, it is preferable that the intermediaries know that they are not necessarily receiving correct data and/or the correct program, and that other intermediaries are being utilized.

Figure 3:
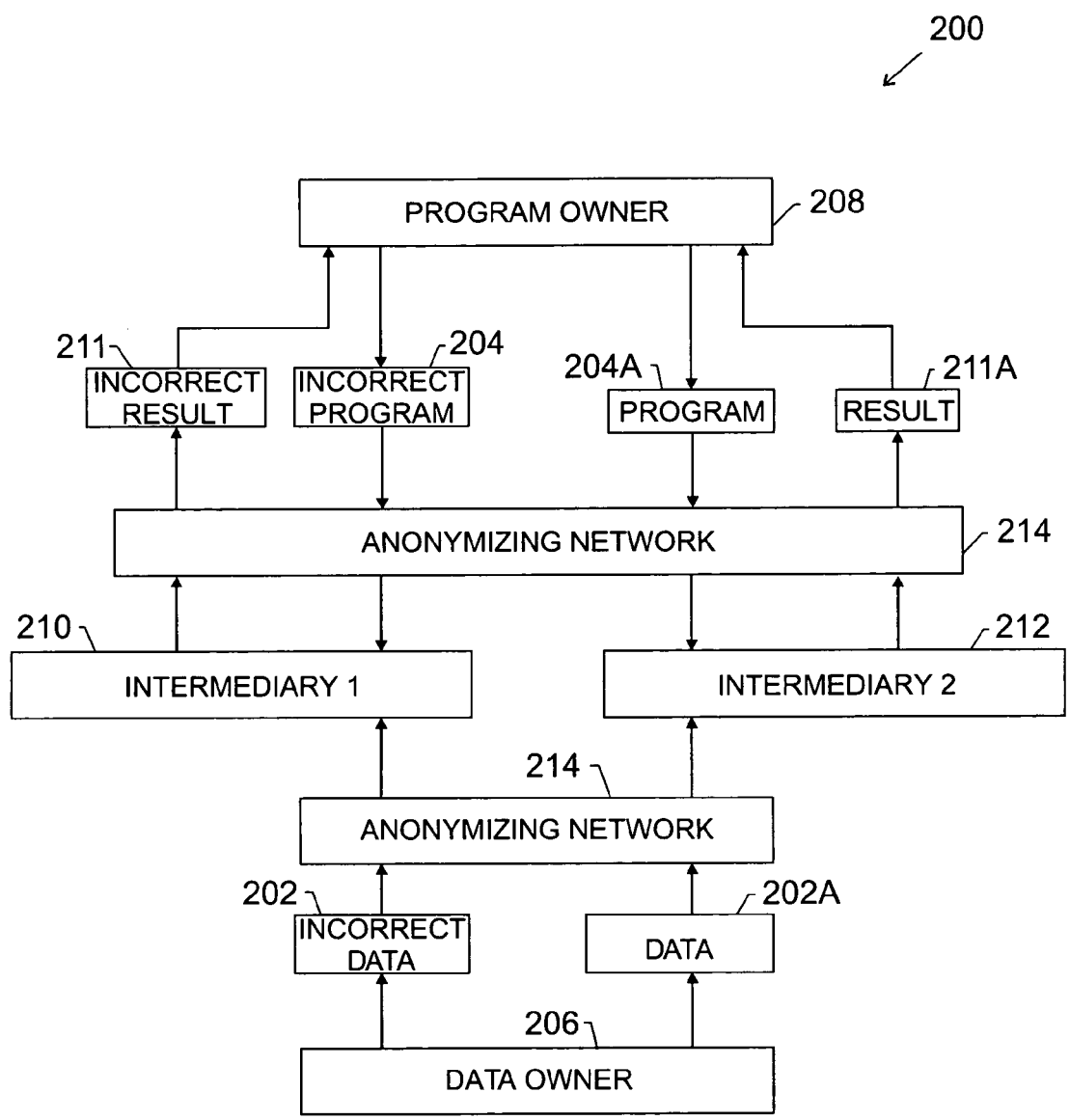
FIG. 3 is a flow chart that illustrates a process in accordance with certain embodiments of the present invention.

FIG. 3 is a flow chart that illustrates a process in accordance with embodiments of the present invention. The block diagram of FIG. 3 illustrates an algorithm 200, which operates to share data 202A and a program 204A between parties (data owner 206 and program owner 208) through a plurality of intermediaries 210, 212 in an anonymous fashion. The exemplary embodiment illustrated by FIG. 3 may be desirous if, for example, there is a possibility that one of the intermediaries 210, 212 is in collusion with either the data owner 206 or program owner 208. A path through an anonymizing network 214, which in one embodiment comprises a series of intermediaries (not shown), can be constructed so that neither the data owner 206 nor the program owner 208 knows which intermediary 210, 212 produced the correct result 210A because incorrect data 202, an incorrect program 204, and incorrect results 210 are also respectively submitted and obtained.

Specifically, FIG. 3 illustrates the data owner 206 submitting correct data 202A and plausible but incorrect data 202 through the anonymizing network 214 to a plurality of intermediaries 210, 212. Next, the program owner 208 submits the correct program 204A and the plausible but incorrect program to the plurality of intermediaries through the anonymizing network 214. The plurality of intermediaries 210, 212 then utilize the programs 204, 204A to interpret the data 202, 202A and are shown in the illustrated embodiment to submit the results 211, 211A to the program owner 208 through the anonymizing network 214. This submission process results in the data owner 206, the program owner 208, and the intermediaries 210, 212 not knowing which intermediary 210, 212 produced the correct result. In some embodiments, where the program 204, 204A is modest enough and the program owner 208 can distinguish a correct result 211 A from an incorrect one 211, for example, by verifying an account number, the data owner 206 and program owner 208 can assign intermediaries 210, 212 at random until the correct data 202A and program 204A come together.

Figure 4:
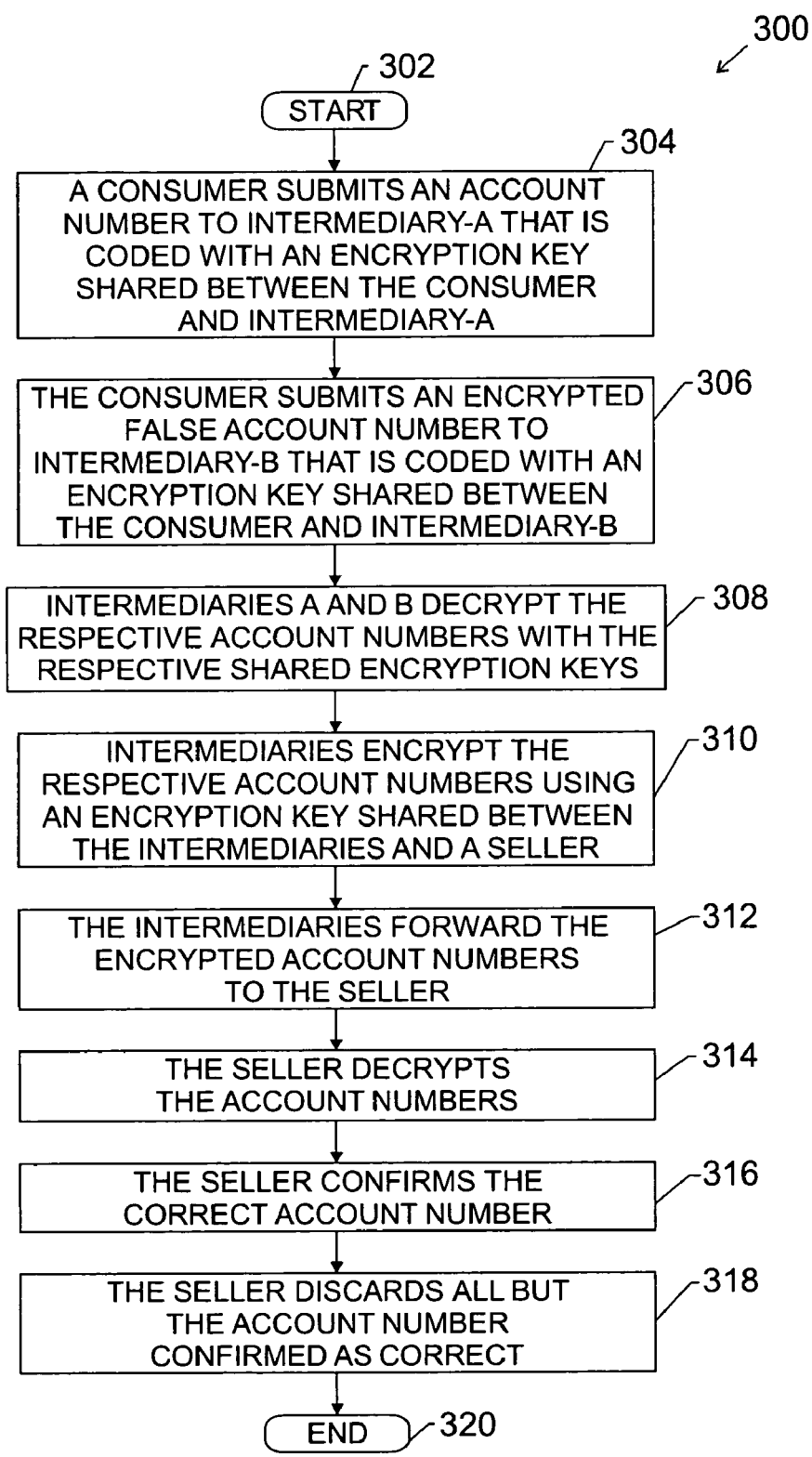
FIG. 4 is a flow chart that illustrates a process in accordance with certain embodiments of the present invention.

FIG. 4 is a flow chart that illustrates a process in accordance with embodiments of the present invention. The flow chart is generally referred to by the reference numeral 300 and it illustrates use of the present invention in place of a public key infrastructure protocol or a key exchange protocol between a consumer and seller by using an intermediary-A and an intermediary-B. This particular embodiment of the present invention, as illustrated, may be beneficial when, for example, the consumer trusts intermediaries with his encryption key but not with his account number. And, the consumer does not trust the seller with his encryption key. However, in the example scenario, the seller needs the consumer's account number. Further, in the illustrated scenario, the seller has a means of detecting correct account numbers, for example, by using a check sum.

Specifically, in FIG. 4, block 302 designates the start of this particular embodiment of the disclosed invention. In block 304, the consumer submits an encrypted account number to the intermediary-A, followed in block 306 by a submission of an encrypted false account number to the intermediary-B. The intermediaries have the consumer's encryption key and, as shown in block 308, decrypt the account numbers. Next, in block 310, the intermediaries again encrypt the account numbers using an encryption key shared with the seller. As shown in blocks 312 and 314, the intermediaries forward the re-encrypted account numbers to the seller and the seller decrypts the account numbers using the appropriate shared encryption key. The seller then performs an account number verification, such as a checksum, to determine which account number is valid, as shown in block 316. Finally, as shown in block 318, the seller discards all but the correct account number. Thus, the process comes to an end (block 320). The embodiment of the present invention illustrated in FIG. 4 works best if the account number can only be used once and/or the penalties for using an incorrect number are severe.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of exchanging information between at least one party and a plurality of intermediaries via an anonymizing network such that misappropriation of the information is avoided, the plurality of intermediaries including a selected intermediary, the method comprising:

providing correct electronic data to the selected intermediary via the anonymizing network;

providing incorrect electronic data to each of the plurality of intermediaries who are not the selected intermediary via the anonymizing network;

receiving modified correct information based on the correct electronic data from the selected intermediary via the anonymizing network, wherein the selected intermediary interpreted the correct electronic data to yield the modified correct information with a data analysis program;

receiving modified incorrect information based on the incorrect electronic data from each of the plurality of intermediaries who are not the selected intermediary, wherein each of the plurality of intermediaries who are not the selected intermediary interpreted the incorrect electronic data to yield the modified incorrect information with one of a plurality of analysis programs; and wherein the anonymizing network functions such that the plurality of intermediaries do not know which of the plurality of intermediaries is the selected intermediary.

2. The method set forth in claim 1, comprising creating the incorrect electronic data from the correct electronic data.

3. The method set forth in claim 1, comprising creating the incorrect electronic data as a plausible variation of the correct electronic data.

4. The method set forth in claim 1, comprising providing proprietary data as the correct electronic data.

5. The method set forth in claim 1, comprising providing a proprietary program to the selected intermediary.

6. The method set forth in claim 1, comprising providing the correct electronic data in encrypted form.

7. The method set forth in claim 1, comprising providing the incorrect electronic data in encrypted form.

8. The method set forth in claim 1, comprising receiving the modified correct electronic data based on the correct electronic data in encrypted form.

9. A method of exchanging information among a first party, a second party, a selected intermediary and a non-selected intermediary via an anonymizing network such that misappropriation of the information is avoided, the method comprising:

using a computer programmed with a data exchange algorithm to facilitate:

providing, by the first party, correct first party information to the selected intermediary via the anonymizing network;

providing, by the second party, correct second party information to the selected intermediary via the anonymizing network;

providing, by the first party, incorrect first party information to the non-selected intermediary via the anonymizing network;

providing, by the second party, incorrect second party information to the non-selected intermediary via the anonymizing network;

processing, by the selected intermediary, the correct first party information in conjunction with the correct second party information to produce selected intermediary information via the anonymizing network;

processing, by the non-selected intermediary, the incorrect first party information in conjunction with the incorrect second party information to produce non-selected intermediary information;

providing, by the selected intermediary, the selected intermediary information to at least one of the first party and the second party via the anonymizing network; and providing, by the non-selected intermediary, the non-selected intermediary information to the at least one of the first party and the second party via the anonymizing network.

10. The method set forth in claim 9, comprising selecting the selected intermediary.

11. The method set forth in claim 9, comprising creating the incorrect first party information from the correct first party information.

12. The method set forth in claim 9, comprising creating the incorrect first party information as a plausible variation of the correct first party information.

13. The method set forth in claim 9, comprising providing proprietary data as the correct first party information.

14. The method set forth in claim 9, comprising providing a proprietary program as the correct first party information.

15. The method set forth in claim 9, comprising providing the correct first party information in encrypted form.

16. The method set forth in claim 9, comprising providing the incorrect first party information in encrypted form.

17. The method set forth in claim 9, comprising providing the selected intermediary information in encrypted form.

18. A method of processing information, comprising:
using a computer programmed with a data exchange algorithm to facilitate:
receiving, by a selected intermediary, correct information from a first party via an anonymizing network;
receiving, by the selected intermediary, a correct program from a second party via the anonymizing network;
processing the correct information with the correct program to produce intermediary information;
providing the intermediary information to at least one of the first party and the second party via the anonymizing network; and
wherein a plurality of additional non-selected intermediaries receive and process incorrect first party information in conjunction with an incorrect program via the anonymizing network.

19. The method set forth in claim 18, comprising receiving proprietary data as the correct information.

20. The method set forth in claim 18, comprising receiving a proprietary program as the correct program.

21. The method set forth in claim 18, comprising providing the intermediary information in encrypted form.

22. The method set forth in claim 18, comprising receiving the correct information in encrypted form.

23. A method of exchanging information between at least one party and an intermediary via an anonymizing network such that misappropriation of the information is avoided, the method comprising:
a party providing at least two sets of information to the intermediary using a data exchange algorithm in conjunction with the anonymizing network, wherein the at least two sets include a set of correct information and a set of incorrect information that is plausible;
the party receiving at least two sets of modified information from the intermediary using the data exchange algorithm in conjunction with the anonymizing network, wherein the at least two sets of modified information include modified information resulting from running a data analysis program on the correct information and on the incorrect information; and
wherein the anonymizing network functions such that the intermediary does not know which of the at least two sets of information is the correct information and does not know which of the at least two sets of modified information is based on the correct information.

24. The method set forth in claim 23, comprising creating the incorrect information from the correct information.

25. The method set forth in claim 23, comprising creating the incorrect information as a plausible variation of the correct information.

26. The method set forth in claim 23, comprising providing proprietary data as the correct information.

27. The method set forth in claim 23, comprising providing a proprietary program as the correct information.

28. The method set forth in claim 23, comprising providing the correct information in encrypted form.

29. The method set forth in claim 23, comprising providing the incorrect information in encrypted form.

30. The method set forth in claim 23, comprising receiving the modified information based on the correct information in encrypted form.

* * * * *